United States Patent

Updyke

[11] Patent Number: 5,261,346
[45] Date of Patent: Nov. 16, 1993

[54] SEGMENTED HEAVY DUTY BOAT WITH MULTI-USE SEGMENTS

[76] Inventor: John R. Updyke, 11923 Brookwood Cir., Austin, Tex. 78750

[21] Appl. No.: 992,803
[22] Filed: Dec. 18, 1992
[51] Int. Cl.⁵ ............................................. B63B 7/04
[52] U.S. Cl. ................................................ 114/352
[58] Field of Search ................. 114/77 R, 77 A, 352, 114/353, 354

[56] References Cited

U.S. PATENT DOCUMENTS

| | | |
|---|---|---|
| D. 297,134 | 8/1988 | Levine . |
| D. 305,636 | 1/1990 | Kienlien . |
| 1,445,792 | 9/1922 | Olson .................. 114/352 |
| 2,422,930 | 6/1947 | Rutledge ............... 114/353 |
| 2,650,376 | 9/1953 | Sommer ................ 114/352 |
| 2,659,464 | 11/1953 | Sweetman ............ 114/353 |
| 3,097,377 | 7/1963 | Rough .................. 114/353 |
| 3,175,234 | 7/1963 | Kutsi ..................... 114/353 |
| 3,684,139 | 8/1972 | Johnson ................ 114/352 |
| 3,822,427 | 7/1974 | Ewart, Jr. ............. 114/352 |
| 4,478,167 | 10/1984 | Hart ...................... 114/352 |
| 4,522,145 | 6/1985 | Stone .................... 114/352 |
| 4,671,202 | 7/1987 | Johnson ................ 114/353 |
| 4,693,203 | 9/1987 | Lewis .................... 114/353 |
| 4,718,587 | 1/1988 | Roberts ................ 114/352 |
| 4,794,876 | 1/1989 | Levine .................. 114/353 |
| 4,827,865 | 5/1989 | Yelderman ........... 114/353 |
| 4,841,900 | 1/1989 | Maselko ............... 114/352 |

FOREIGN PATENT DOCUMENTS

| | | | |
|---|---|---|---|
| 1063527 | 5/1954 | France .................. 114/352 |
| 664780 | 6/1964 | Italy ...................... 114/352 |

Primary Examiner—Jesus D. Sotelo
Attorney, Agent, or Firm—Joseph F. Long

[57] ABSTRACT

The invention covers a boat comprising a minimum of two segments with interlocking dovetail joints and equipped with a pair of heavy duty clamps to fit over adjacent ends of each segment and clamp the segments together near the top and close to the bottom of each segment in order to hold the segments rigidly together of a point of maximum stress.

6 Claims, 3 Drawing Sheets

SEGMENTED HEAVY DUTY BOAT WITH MULTI-USE SEGMENTS

BACKGROUND OF THE INVENTION

There have been numerous patents granted on sectionalized structures that are useable as car top carriers and that may be assembled to form a boat starting at least as far back as U.S. Pat. No. 1,445,792 by A. E. Olsen and filed in 1922. However, we do not see wide use indicating that the past structures must be lacking in features of salability or useability.

We now have high strength sunlight resistant composite plastic material that is vacuum formable. Our invention, using a composite plastic material, covers a design with following desirable characteristics:

a) Vacuum formable to allow use of a low cost mold;
  b) Expandable from two sections to three or more;
  c) Utilizes one or more seats to give quite rigid but light weight boat;
  d) Uses specially designed multi-use clamps in addition to interlocking dovetail joints to clamp sections solidly together at the point of maximum stress to allow continued use in rough water. The clamp also provides rigid adjustable oar lock positions and acts as a bumper on each side of the boat.
  e) Has recessed handles in each segment to allow easy manipulation and provide for fastening segments together and fastening in place on top of a car. Large suction cups to protect the car top are used to anchor the segment to the car top.
  f) Uses high strength light weight sunlight resistant plastic composite material that may be vacuum formed.
  g) Segments that may be used for uses such as a watering trough, wading pool or decorative pool and also used as part of a boat or carrier container.

This design provides low cost movability to form a heavy duty expandable boat with multi-use segments with safe but simple connections, allows storage in a limited space, and fills a need for the casual user with limited budget.

We consider U.S. Pat. No. 4,718,587 by Roberts issued Jan. 12, 1988 as the closest prior art. There are important differences. Roberts uses a dovetail joint only to connect two segments. This joint is similar to ours, but quite different in that we use a pair of clamps with pressure pads in addition to this joint to clamp segments rigidly together at the top and at the very bottom of the boat which is the point of maximum stress. Further, Roberts design lacks handles for ease of handling; is not expandable and would not appear to be suitable for uses such as a wading pool, etc. Our design is therefore more useable overall and being moldable should be cheaper to make.

BRIEF SUMMARY OF INVENTION

The invention encompasses segments to form a two segment boat and an additional type segment to allow assembling a boat of three or more segments. The segments are joined together by dovetail joints with a female portion of the joint in one segment and an interlocking male portion in another segment. This joint adds rigidity but for a solid connection a U shaped clamp is used on each side of the joint. These clamps each have pressure pads threadably connected with hand operated pressure drive wheels and serve to hold adjacent ends of the boat segments rigidly together near the bottom of the boat as well as near the top. Thus, the segments are held very tight at the point of maximum separation stress. A top angle of the clamps extends outward over the segments and contains openings for oar locks.

Interior projecting ridges or ribs are molded in each segment to add rigidity and to provide for fastening the ends of a seat to form a quite rigid structure with minimum thickness plastic. Each seat is equipped with a flotation device which may simply be an air filled tube or a styrofoam block.

Molded into each side of each segment is a recessed handhold with a metal bar. These handholds facilitate handling and may also be used as fastening point. Segments may be fastened together to form a waterproof container of carrier. For use as luggage carrier on a car large rubber suction cups may be used on the assembled carrier to protect the car top and handholds may be used as anchor points to fasten the carrier firmly to the vehicle.

DETAILED DESCRIPTION OF THE INVENTION

The invention may best be described from the drawings. Each of the segments as shown in FIG. 1 through FIG. 7 are molded from a high strength sunlight resistant plastic composite.

Desirable characteristics of plastic used are:
  a) vacuum moldable;
  b) light weight;
  c) high strength;
  d) sunlight resistant;
  e) repairable; and
  f) low cost per pound.

A damage resistant acrylic over ABS TM, an acrylic-butadiene-styrene polymer, is currently a preferred composite plastic with most of these characteristics.

Figure 1:
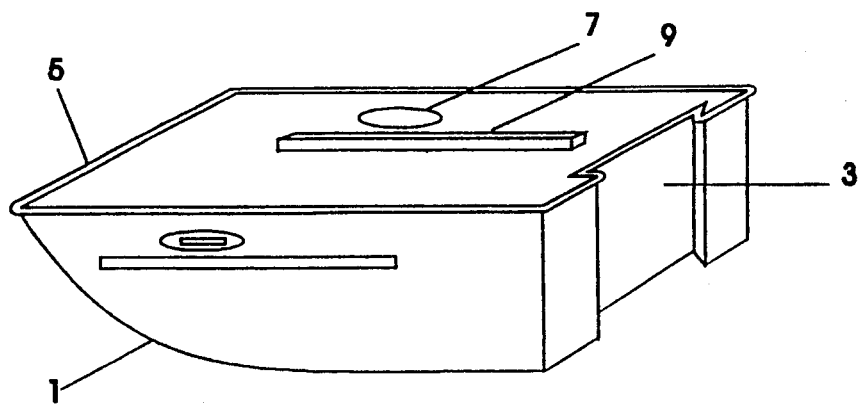
FIG. 1 shows a first or beginning segment of a two segment boat.

In FIG. 1 we show a first segment 1 with a molded flange 5 that curves upward and a female portion of a dovetail joint 3. In each side there is an inward projecting rib 9 that not only adds rigidity by itself, but when a seat 21, FIG. 3 is fastened solidly to the rib, greater strength is added to what becomes a shell-like structure. A recessed handhold 7 comprising a recession in the plastic with a metal bar rigidly fastened therein is fashioned on each side of segment 1 and also segment 11, FIG. 2 and also segments 11 and 17, FIG. 3. The recessed handholds not only aid in handling the light but bulky segments, but also allow a convenient spot for fastening segments together or in any desired position with any of a multitude of different fasteners including simply a rope.

Figure 2:
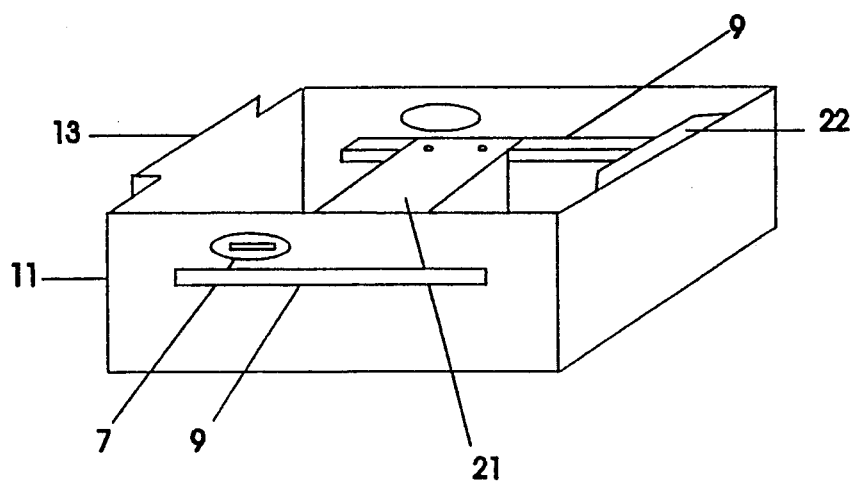
FIG. 2 shows a second segment or end segment of a two segment boat.
Figure 3:
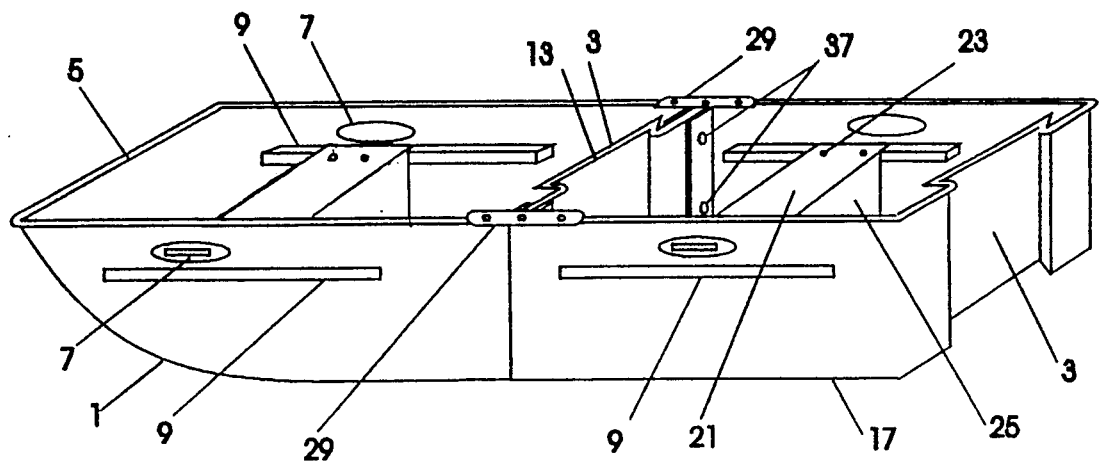
FIG. 3 shows the first two segments of a multiple segment boat with U shaped clamps holding the first to the second segment.

FIG. 2 shows an end segment 11 for use in either a dual or multiple segment boat structure. Segment 11 has a male section 13 of a dovetail joint formed by sliding 13 into 3, FIG. 1. Ribs or ridges 9 and handholds 7 are similar to those in FIG. 1. The top edge is rounded and sized to fit into flange 5, FIG. 1. The rearward end may be thickened 22 for greater motor support or loose flat panel may be clamped to the rearward end to distribute stress. Alternatively, section 11, FIG. 2, may be replaced with segment 17, FIG. 3, and a flat panel (not shown) may be slid into female joint 3 to provide greater rigidity for motor support.

Figure 4:
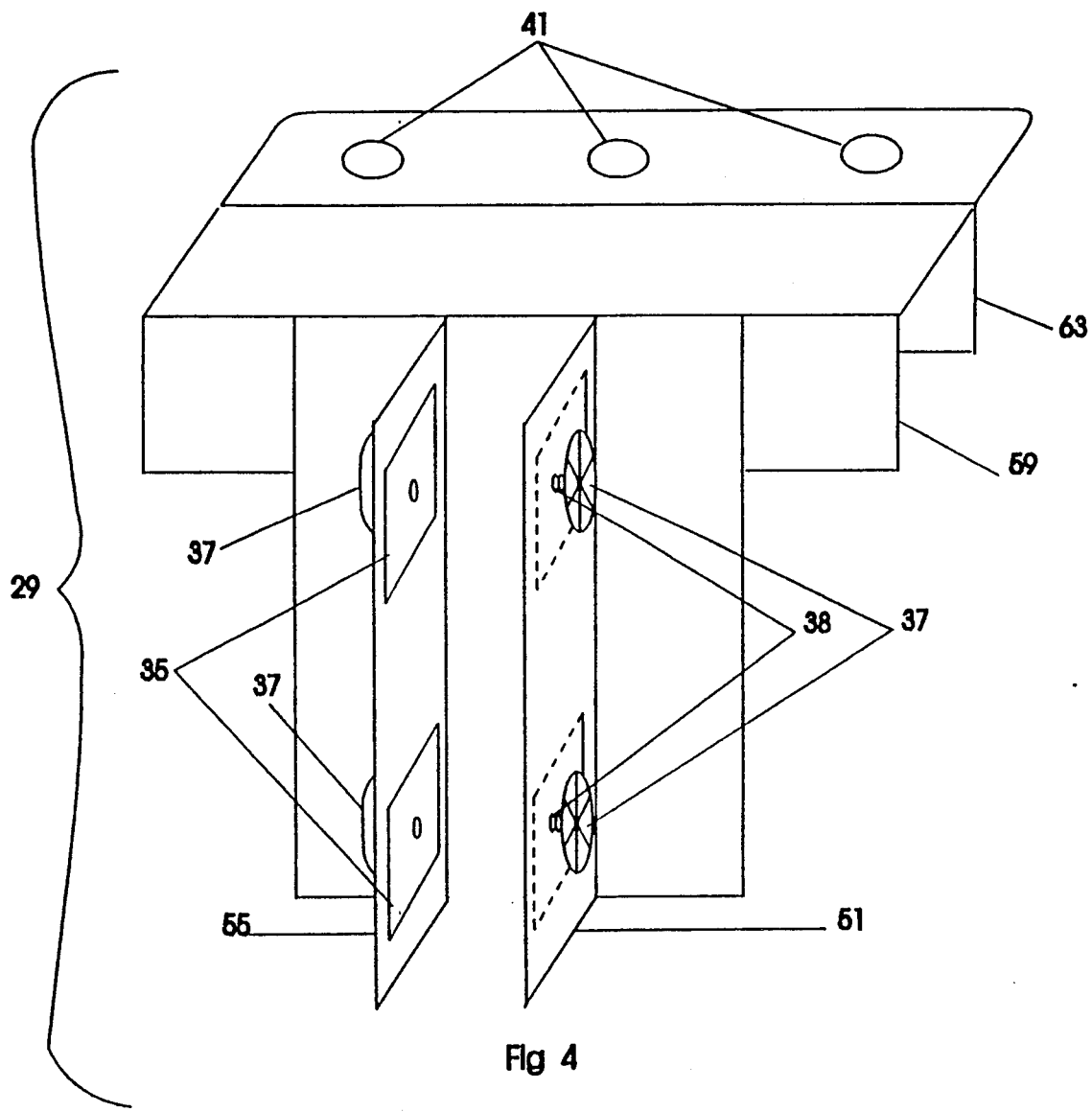
FIG. 4 shows a perspective view of the U shaped clamp.
Figure 6:
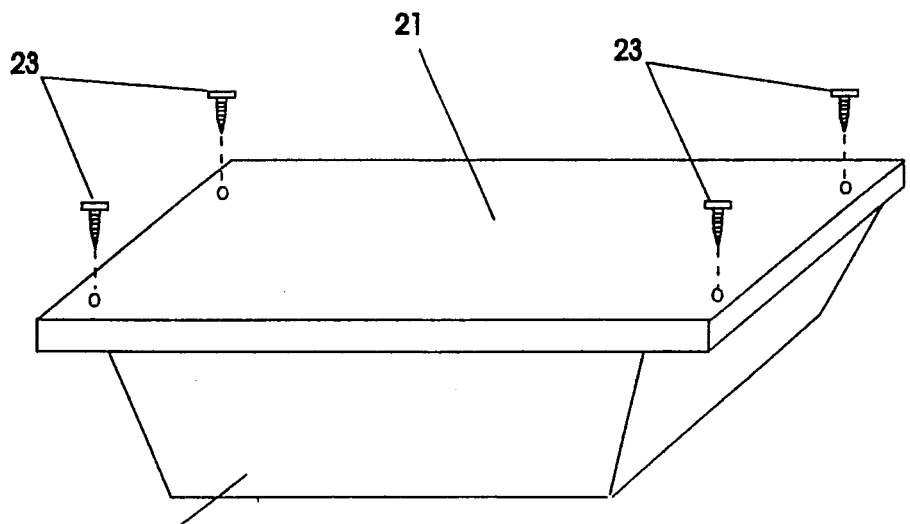
FIG. 6 shows seat and flotation unit.
Figure 5:
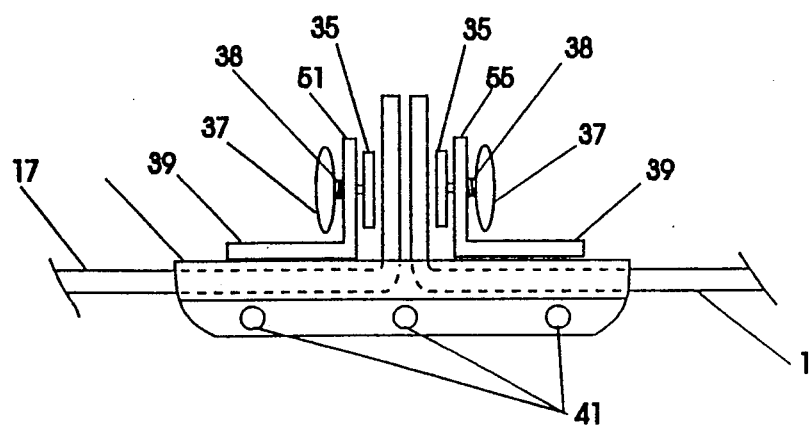
FIG. 5 shows a detail of a top view of the U shaped clamp as it would be installed to adjacent interlocked segments to hold them firmly together.

In FIG. 3 we've shown the first two segments for a multiple segment boat structure. From examination of segment 17, we see that multiple segments 17 may be fitted together and a four or more segmented boat structure is within the purview of this invention. In FIG. 3 segment 1 is the same as segment 1, FIG. 1 and segment 11 is the same as segment 11, FIG. 2. Segment 17 differs from segment 11 by having a female part 3 of a dovetail joint molded therein. With female part 3 on a rearward end and a male part 13 on a forward end multiple segments 17 may be fastened together. U shaped clamps 29, which are shown in detail in FIGS. 4 and 5, are shown clamping segment 1 firmly to segment 17. Pressure drive wheels 37 are located to clamp these segments rigidly together not only near a top edge but also very near the bottom. When a boat structure is propelled forward, particularly in rough water, there is a maximum stress tending to spread the segments apart at this point. The clamps 29 also provide for multi-position oar locks and preferably extend over the side of the segments to act as a bumper when docking. Seat 21, shown in detail in FIG. 6, is rigidly fastened through ribs 9 at point 23. Fasteners may be bolts, lag screws, etc. With a rigid bottom, rigid ends and seat 21 fastened in place each segment is nearly a shell-like structure.

In FIG. 4 we show a perspective view of a U shaped clamp 29. The clamp 29 may be conveniently made from any one of several different metal angles as shown or alternatively from metal channels with stainless steel being preferred. Angle pieces 51 and 55 are of a length slightly less than the depth of the segments 1, FIGS. 1 and 11, FIG. 2. An upper end of angles 51 and 55 is welded as indicated to angle 59. An edge of the other face of angle 59 is welded to angle 63 as indicated thus forming a U shaped channel. A portion of angle 59 between angles 51 and 55 is removed thus allowing clamp 29 to fit over adjacent ends of two segments with the U shaped channel fitting over the sides of the adjacent ends as shown in a top view in FIG. 5. An upper side of angle 63 has one or more openings 4 to admit oar locks. Pressure drive wheels 37 are fastened rigidly to threaded rods 38 that go through threaded openings in one side of angles 51 and 55 and are connected with a rotatable connection to pressure pads 35. When pressure pads 35 are driven inward adjacent ends of adjacent segments will be pressured together both at the top and also near the bottom of each segment.

FIG. 5 shows a top detailed view of clamp 29 as also shown in FIG. 3 indicating how pressure pads 35 are driven toward each other to clamp adjacent ends of segment 1 and segment 17 firmly together while the U shaped channel, FIG. 4, of the clamp 4 fits over the sides of segment 1 and 17. Holes 41 allow movably placing oar locks and the clamp as installed also serves as bumper to protect the sides of the segments. In FIG. 5 threaded rods 38 are connected to pressure drive wheels 37 and threaded through angle 51 and 55 and each connected with rotatable joint to a pressure pad 35.

In FIG. 6, we show seat 21 which is integrally attached to a flotation unit 25. The flotation unit 25 may be in any of several forms including a sealed empty box or a styrofoam block. Fasteners 23 are indicated as big screws but any of several types of fasteners would be satisfactory to fasten seat 21 to internal rib or projections 9 in each segment. Seats 21, when fastened in place, lend rigidity to each segment. We have shown only one seat in a segment but depending upon the length of the segment, two or more may be desirable. Although not shown, a seat with a container for various gear may also be included.

Figure 7:
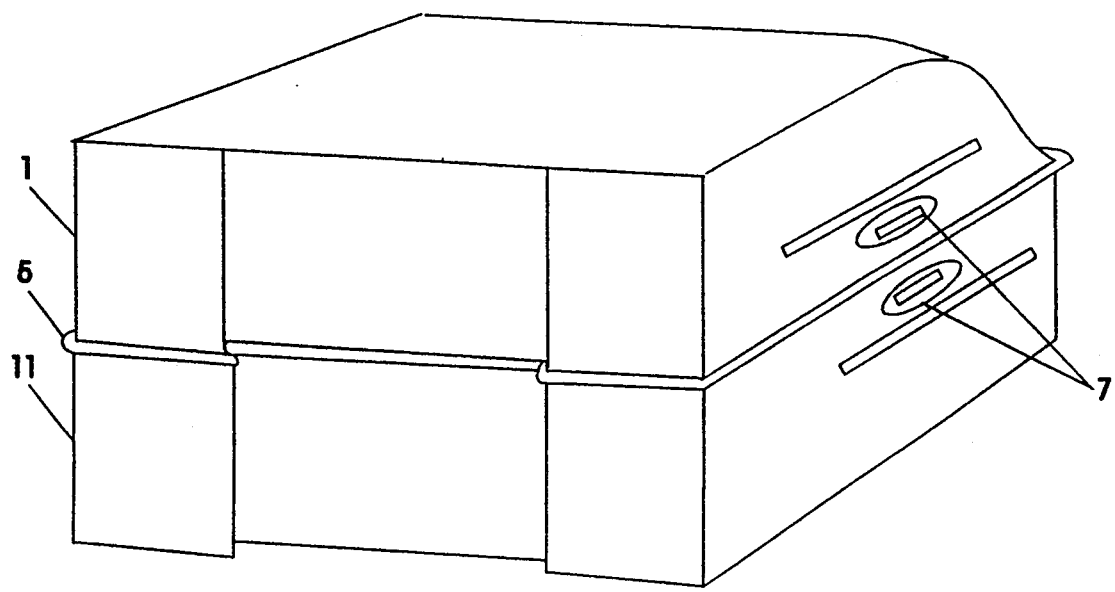
FIG. 7 shows two segments assembled as a carrier for a car top or as storage container.

In FIG. 7 we show segment 1 placed over segment 11 with flange 5 serving to make the pair a weather proof container. Recessed handholds 7 may be used to fasten the two segments together. When the unit is used as a car top carrier, a preferred car top mount uses four large suction cups to anchor the unit to the car top while a safety rope through recessed handholds further anchors the unit to the car.

What is claimed is:

1. A segmented boat with multi-use segments comprising:
   a) a first segment with a flanged rectangular shaped top edge, a sloping leading end, sloped from said top edge to a bottom, a rearward end at right angles to said bottom with said rearward end having a first female dovetail joint means to slidably engage a male dovetail joint;
   b) a second segment box-like in shape with said male dovetail joint integrally formed in a leading end and sized to slidably engage said first female dovetail joint and with a second female dovetail joint integrally formed in a rearward end;
   c) a pair of U shaped clamp means with each of said clamp means having a minimum of one oar lock opening and each of said clamp means having threaded pressure connectors that allow rigidly but removably fastening said rearward end of said first segment to said leading end of said second segment after said male dovetail joint in said leading end is slidably engaged with said female dovetail joint in said first segment.

2. A segmented boat with multi-use segments as in claim 1 further comprising a minimum of two seats and internal rib means, both said first segment and said second segment having one of said internal rib means on each interior side; said internal rib means adding stiffness and rigidity to said segments and being sized and located to allow sliding ends of said seats above said ribs and rigidly fastening said ends to said ribs thereby further adding rigidity to each of said segments.

3. A segmented boat with multi-use segments as in claim 2 wherein each of said seats has a flotation means attached under said seat and sized to flat each of said segments.

4. A segmented boat with multi-use segments as in claim 1 wherein said U shaped clamp means comprises:
   a) a rigid U shaped member, a minimum of four pressure pads and a minimum of four pressure drive wheels with each leg of said U shaped member having a minimum of two threaded holes to threadably receive a threaded rod connected to said drive wheel on an outer end and rotatably connected to said pressure pads on an inner end; thereby allowing use of said U shaped clamp means to slide over adjacent ends of said first segment and said second segment and to clamp said segments rigidly together close to the top and close to the bottom of said segments using said pressure drive wheels;

b) a rigid member rigidly attached to the upper segment connecting each leg of said U shaped member with a minimum of one oar lock opening in said rigid member.

5. A segmented boat with multi-use segments as in claim 1 wherein said first segment and said second segment are formed with a recessed handhold in each side and wherein the upper rim of said first segment is formed with a flange means thereby allowing said first segment to be used as a cap over said second segment to form a rain proof storage box.

6. A segmented boat with multi-use segments comprising:
 a) a minimum of three open box-like segments with a first of said segments having a sloped forward end and a rearward end with slidable engagement means to slidably engage a non-sloped forward end of a second of said segments and with said second segment having a slidable engagement means to slidably engage a non-sloped forward end of a third of said segments;
 b) a minimum of two pairs of U shaped clamp means with one of said two pairs serving to clamp said first segment to said second segment and with the remaining pair of said two pairs serving to clamp said second segment to said third segment;
 c) a rigid member rigidly attached to the upper segment connecting each leg of said U shaped clamp means with said rigid member, said rigid member having a minimum of one oar lock opening.

* * * * *